United States Patent

Schultenkamper

[15] 3,635,535
[45] Jan. 18, 1972

[54] END THRUST PLATE OF A UNIVERSAL JOINT

[72] Inventor: Josef Schultenkamper, Essen, Germany
[73] Assignee: Gelenkwellenbau GmbH, Essen, Germany
[22] Filed: Dec. 2, 1969
[21] Appl. No.: 881,403

[52] U.S. Cl. ............................................308/172, 308/212
[51] Int. Cl. .....................................F16c 17/04, F16c 33/20
[58] Field of Search....................308/172, DIG. 7, 135, 212; 64/17 A

[56] References Cited

UNITED STATES PATENTS

| | | | |
|---|---|---|---|
| 1,786,565 | 12/1930 | Freeman | 308/164 |
| 2,246,092 | 6/1941 | Gilman | 308/DIG. 7 |
| 3,300,230 | 1/1967 | Spencer | 308/163 |
| 3,370,897 | 2/1968 | Rylatt | 308/168 |

FOREIGN PATENTS OR APPLICATIONS

| | | | |
|---|---|---|---|
| 681,685 | 3/1964 | Canada | 308/135 |
| 821,470 | 10/1959 | Great Britain | 308/DIG. 7 |
| 828,232 | 2/1960 | Great Britain | 308/DIG. 7 |

Primary Examiner—Martin P. Schwadron
Assistant Examiner—Frank Susko
Attorney—Curt M. Avery, Arthur E. Wilfond, Herbert L. Lerner and Daniel J. Tick

[57] ABSTRACT

End thrust plate for journal pins of a universal joint cross-link wherein the end thrust plate is floatingly disposed between the end face of a journal pin and the base of a bearing bushing associated therewith includes a plate member formed of a heat-stabilized, highly crystalline and heat-resistant synthetic plastic material, and lubricant cup means molded within and integral with the plate member at opposite faces of the latter.

13 Claims, 9 Drawing Figures

END THRUST PLATE OF A UNIVERSAL JOINT

The invention relates to an end thrust plate for the journal pins of a universal joint cross-link, the end thrust plate being floatingly disposed between the end face of the journal pin and the bottom of the bearing bushing associated therewith and being provided with lubricating cups in the end faces thereof.

A known end thrust plate of the aforementioned type is made from a high-strength copper alloy ("Cuprodur"). Although this known plate has lubricating cups, considerable wear is unavoidably produced during use thereof. The lubricant cups can only be installed by mechanical operation which increases the cost of the plate.

Conventionally manufactured and processed synthetic plastic materials had not hitherto seemed feasible for the production of end thrust plates, since injection molding of such synthetic plastics normally produces an amorphous surface which is soft and which would wear out rapidly if used for end thrust plates. Due to the high operating temperatures that are likely to arise, the surface of such synthetic plastics becomes still softer and rapid wear thereof is enhanced.

It is accordingly an object of my invention to provide end thrust plate of a universal joint which is subject to little wear and can be manufactured relatively inexpensively.

With the foregoing and other objects in view, I provide according to my invention end thrust plate of the foregoing type which is formed of a heat-stabilized, highly crystalline and heat-resistant synthetic plastic material, the lubricant cups being molded during manufacture within the plastic material so as to be integral therewith.

In accordance with other features of my invention, the synthetic plastic material is polyamide reinforced by glass fibers, and may additionally contain added solids such as $MoS_2$ to act as lubricant.

In accordance with another feature of the invention, the synthetic plastic material is a modified polyester.

In order to be able to apply the lubricant from the middle of the cross-link in the simplest manner to both sides of the end thrust plate, further in accordance with my invention, the end thrust plate is of annular construction.

In accordance with an additional feature of my invention, I provide grooves on the end faces of the end thrust plate which form mirror images of one another, are staggered by the same angle, extend from the inner to the outer diameter of the end thrust plate and overlap one another in peripheral direction.

In accordance with an added feature of my invention, the grooves have a curved shape.

Other feature which are considered as characteristic for the invention are set forth in the appended claims.

Although the invention is illustrated and described herein as embodied in end thrust plate of a universal joint, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
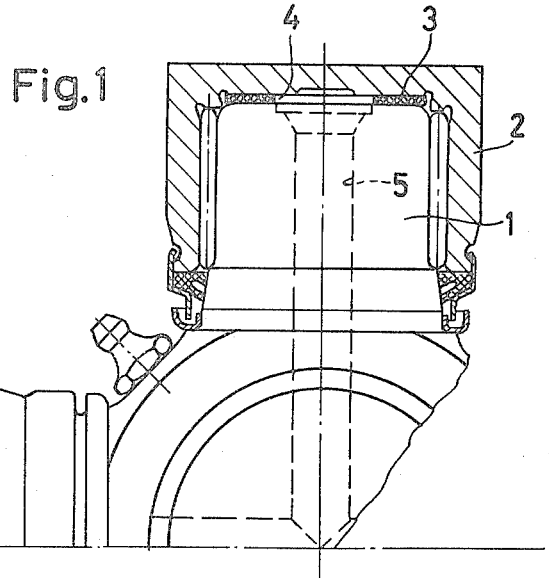
FIG. 1 is an end elevational view partly in section of a universal joint cross-link with an end thrust plate according to the invention.

Referring now to the drawings, and first particularly to FIG. 1 thereof, there is illustrated part of a conventional cross-link for a universal joint journal pin 1, a needle bushing 2 associated with the journal pin 1 being shown in section. Freely floating between the base of the bushing 2 and the end of the journal pin 1 is an end thrust plate 3 being formed in its center with a bore 4 through which, from the middle of the cross-link, it is supplied with lubricant on both sides through a bore 5 extending axially in the journal pin 1. The plate 3 is formed of synthetic plastic material such as a modified polyester. A polyamide reinforced by glass fibers and containing $MoS_2$ for lubrication is an especially suitable material for the plate 3.

Figure 3:
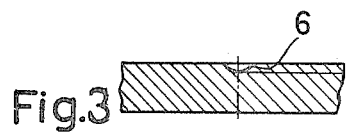
FIG. 3 is a fragmentary sectional view taken along the line III—III in FIG. 2.
Figure 2:
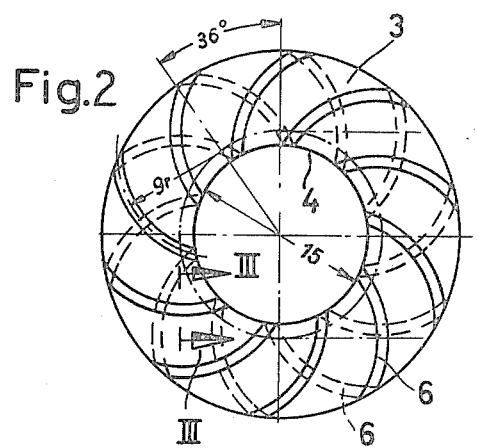
FIG. 2 is a plan view of the end thrust plate of FIG. 1.

FIGS. 2 and 3 show an elevational and a fragmentary sectional view respectively of the end thrust plate 3. In FIG. 2, the end thrust plate 3 has on its end faces curved grooves 6 which are disposed as mirror images of one another, are staggered by equal angles, and extend in each case to the inner and outer diameters of the end thrust plate and overlap one another in peripheral direction of the plate 3.

The grooves, which are provided in relatively large number and have comparatively little depth, serve as reservoirs for lubricant grease and ensure that the plate is at all times floating on both sides thereof on a film of lubricants, so that the plate only rotates with respect to the journal pin over half the angle traversed by the journal pin as the journal pin oscillates. Thus, wear-producing movement is reduced to a minimum at the outset.

Figure 4:
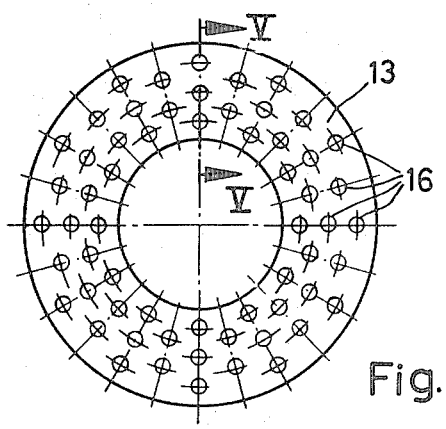
FIG. 4 is a plan view of another embodiment of a thrust plate according to the invention.
Figure 5:
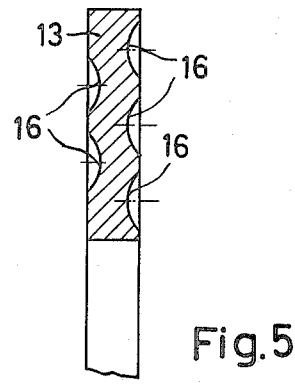
FIG. 5 is a fragmentary sectional view taken along the line V—V in FIG. 4.

In the embodiment of the end thrust plate 13 shown in FIGS. 4 and 5, the lubricant cups are in the form of cup-shaped recesses 16 provided on both sides of the plate 13 to provide grease reservoirs.

Figure 6:
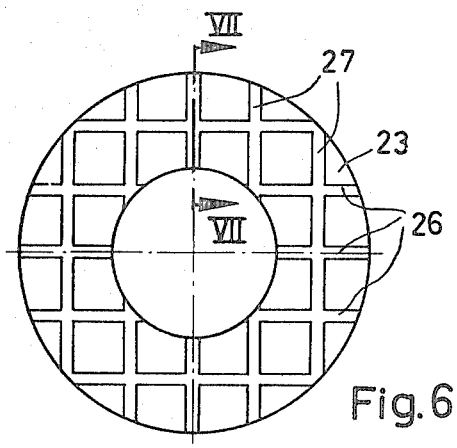
FIG. 6 is a plan view of yet another embodiment of the end thrust plate of FIG. 1.
Figure 7:
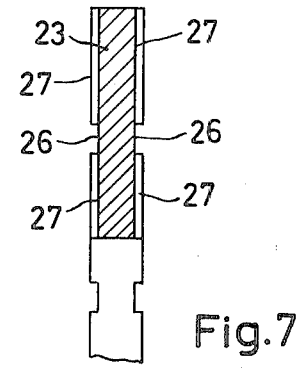
FIG. 7 is a fragmentary sectional view taken along the line VII—VII in FIG. 6.

In the embodiment of the invention shown in FIGS. 6 and 7, an end thrust plate 23 is provided formed on both sides thereof with a gridlike array of longitudinal grooves 26 and 27 acting as grease reservoirs and located respectively at equal distances from one another, the respective grooves 26 and grooves 27 extending parallel to one another, and the grooves 26 being disposed perpendicularly to the grooves 27.

Figure 8:
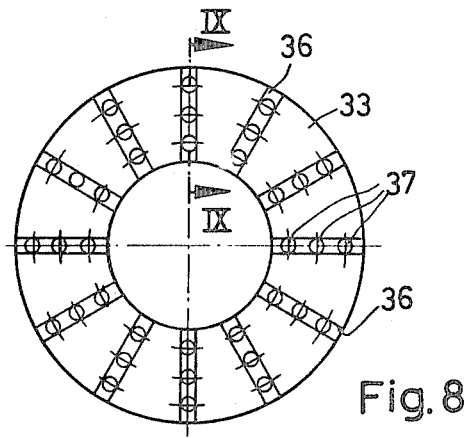
FIG. 8 is a plan view of a further embodiment of the end thrust plate of FIG. 1.
Figure 9:
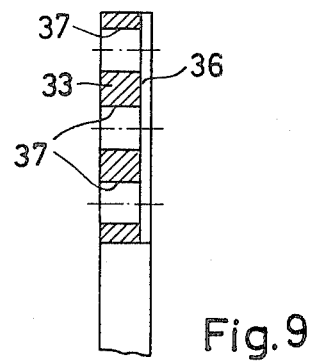
FIG. 9 is a fragmentary sectional view taken along the line IX—IX in FIG. 8.

In the embodiment shown in FIGS. 8 and 9, radially extending grooves 36 are formed on one side of the end thrust plate, while a plurality of radially spaced axial bores 37 extend through the plate from the other side thereof to the radially extending grooves 36. The side of the end thrust plate in which the radially extending grooves 36 are formed is located advantageously adjoining the end face of the journal pin.

I claim:

1. In a journal pin assembly of a universal joint cross-link, in combination, a journal pin having an end face, a bearing bushing associated with said journal pin and having a base facing toward said end face of said journal pin, and an end thrust plate floatingly disposed between the end face of said journal pin and the base of said bearing bushing, said end thrust plate comprising a plate member formed of a heat-stabilized, highly crystalline and heat-resistant synthetic plastic material, and lubricant cup means molded within and integral with said plate member at opposite faces of the latter.

2. Journal pin assembly according to claim 1 wherein said synthetic plastic material is a polyamide reinforced with glass fibers.

3. Journal pin assembly according to claim 2 wherein said polyamide reinforced with glass fibers contains an added substance having lubricant properties.

4. Journal pin assembly according to claim 3 wherein said added substance is $MoS_2$.

5. Journal pin assembly according to claim 1 wherein said synthetic plastic material is a modified polyester.

6. Journal pin assembly according to claim 1 wherein said plate member is of annular construction.

7. Journal pin assembly according to claim 6 wherein grooves are formed on said opposite faces of said annular plate member, the grooves on one face being mirror images of the grooves on the opposite face thereto, said grooves being staggered at similar angles and extending from the inner to the outer peripheries of said annular plate member, each groove overlapping the following groove in the peripheral direction of said annular plate member.

8. Journal pin assembly according to claim 7, wherein said grooves are curved.

9. Journal pin assembly according to claim 1 wherein said lubricant cup means comprise cup-shaped depressions formed on both of said opposite faces of said plate member.

10. Journal pin assembly according to claim 1 wherein said plate member is formed with intersecting grooves on each of the opposite faces thereof.

11. Journal pin assembly according to claim 10 wherein said grooves extend in straight lines and in groups parallel to one another.

12. Journal pin assembly according to claim 10 wherein said grooves intersect at right angles.

13. Journal pin assembly according to claim 1, wherein said plate member is formed on one face thereof with radially extending grooves, and on the opposite face thereof with a plurality of axial bores extending through said radially extending grooves.

* * * * *